(12) United States Patent
Hibbard et al.

(10) Patent No.: US 6,318,884 B1
(45) Date of Patent: Nov. 20, 2001

(54) WORK LIGHT ASSEMBLY USING COMPACT FLUORESCENT LAMPS

(75) Inventors: Mark P. Hibbard, Canastota; Carl W. Hibbard, Tully; Terry J. Hibbard, Canastota; Daniel J. Hibbard, Camillus, all of NY (US)

(73) Assignee: Patricia Electric, Inc., Syracuse, NY (US)

( * ) Notice: Subject to any disclaimer, the term of this patent is extended or adjusted under 35 U.S.C. 154(b) by 0 days.

(21) Appl. No.: 09/553,356

(22) Filed: Apr. 21, 2000

(51) Int. Cl.[7] ..................................................... F21V 21/00
(52) U.S. Cl. .......................... 362/391; 362/249; 362/260
(58) Field of Search ................................... 362/216, 248, 362/249, 260, 363, 376, 378, 396, 391

(56) References Cited

U.S. PATENT DOCUMENTS

| 4,247,884 | 1/1981 | McJunkin, Jr. et al. | 362/164 |
|---|---|---|---|
| 4,410,834 | 10/1983 | Witte et al. | 315/58 |
| 4,520,436 | 5/1985 | McNair et al. | 362/366 |
| 4,563,729 | 1/1986 | Jendrewski | 362/218 |
| 4,658,337 | 4/1987 | Burke | 362/225 |
| 4,841,420 * | 6/1989 | Baggio et al. | 362/249 |
| 4,878,159 * | 10/1989 | Blaisdell et al. | 362/216 X |
| 5,088,015 | 2/1992 | Baggio et al. | 362/217 |
| 5,091,836 * | 2/1992 | Neustadt | 362/391 |
| 5,132,884 | 7/1992 | Totten | 362/147 |
| 5,132,885 | 7/1992 | Hocheim et al. | 362/217 |
| 5,436,815 | 7/1995 | Grooms et al. | 362/216 |
| 5,493,482 | 2/1996 | Bowen | 362/260 |
| 5,649,759 | 7/1997 | Korte | 362/226 |
| 5,688,041 | 11/1997 | Arndt | 362/226 |
| 5,941,626 | 8/1999 | Yamuro | 362/246 |
| 5,997,354 | 12/1999 | Fulop et al. | 439/615 |

* cited by examiner

*Primary Examiner*—Stephen Husar
(74) *Attorney, Agent, or Firm*—Bernhard P. Molldrem, Jr.

(57) ABSTRACT

A worklight string employing compact fluorescent lamps is suitable to be hung in a work area, such as in a building under construction. The worklight string has a power cord and a multiplicity of sockets, e.g., up to thirty or more, at intervals along the power cord. For each socket there is a compact fluorescent lamp of the type that has a standard Edison screw-in medium base. Each compact fluorescent lamp has a plastic globe covering its fluorescent tube. Because the fluorescent lamp is more efficient, three to four times as many lamps can be used on a single string as an incandescent string. The fluorescent lamps avoid safety problems in changing bulbs on the job. Furthermore, the plastic globe protects the workmen from the glass fluorescent tube, and there is no need for the cage that has to be used with incandescent lamps. If the string of lamps falls when it has been turned on, the lamps do not break or go out, and can just be re-strung in the workplace.

9 Claims, 2 Drawing Sheets

WORK LIGHT ASSEMBLY USING COMPACT FLUORESCENT LAMPS

BACKGROUND OF THE INVENTION

This invention concerns a work light for construction purposes, and is in the form of a string of lights that is hung in a work area, typically in a building under construction, to illuminate the work space.

Currently, what is commonly used for construction lighting is a string of incandescent lamps, each of which is contained in a plastic safety cage. This arrangement using incandescent lamps has a number of limitations. First, fourteen-gauge wire cable is the largest that can be used, because larger cable, such as twelve-gauge, becomes too stiff for the workmen to move it from place to place. However, 14-gauge wire limits the total current through the wires to about 15 amps, for safety purposes. This means there is a limit of fifteen one-hundred watt lamps that can be used on a single string. Also, the incandescent lamps have to be protected, and OSHA requires that a safety cage (plastic) be placed over each lamp. Even so, these often fall off during the workday, leaving a bulb uncovered. The incandescent lamps will fail if dropped, even if protected by a cage, because the filament breaks. Even under the most ideal conditions, the lamps last only a few hundred hours, so bulb replacement is a continuing problem, often requiring the workman to climb up a ladder to replace the lamp.

There have been several worklights proposed previously, which incorporate fluorescent lamps. Bowen U.S. Pat. No. 5,493,482 involves a multiple-tube arrangement encased within a tubular case or shell, and where there is a female power receptacle provided so that a number of these can be strung together. Grooms et al. U.S. Pat. No. 5,436,815 relates to a utility light that incorporates a U-shaped fluorescent tube. Burke U.S. Pat. No. 4,658,337 and Hocheim et al. U.S. Pat. No. 5,132,885 relate to portable fluorescent lighting devices, which incorporate straight fluorescent tubes. None of these prior approaches has considered using compact fluorescent lamps to overcome the drawbacks of the conventional (i.e., incandescent) worklight strings, as discussed above.

OBJECT AND SUMMARY OF THE INVENTION

Accordingly, it is an object of the present invention to provide a worklight string that employs compact fluorescent lamps to overcome the drawbacks of conventional light strings, as described above.

It is another object to provide a worklight string that is relatively maintenance free, while being safer and more economical to use than conventional worklight arrangements.

Likewise, it is an object to provide a worklight arrangement that provides ten or more lamps on the string and with which one may connect more strings together on a single circuit.

In accordance with one aspect of the present invention, a worklight string has a multiplicity of sockets, and up to six strings on one circuit, i.e., up to sixty lamps, and in some arrangements perhaps more. The lamps are situated at intervals along a power cord or cable, and for each socket there is a so-called compact fluorescent lamp of the type that has a standard Edison medium base (i.e., the same screw-in base as the incandescent lamp). Each compact fluorescent lamp has a plastic globe covering its fluorescent tube. Because the fluorescent lamp is more efficient, three to four times as many lamps can be used on a single circuit. That is, a 23 watt compact fluorescent lamp provides as much illumination as a 100 watt incandescent, so three to four times as many lamps can be used on a circuit. In one preferred arrangement, the string can have thirty or more lamps, and not be limited to the ten to fifteen lamps of the prior art. Moreover, the fluorescent lamps last many times as long, and there is no issue about safety in changing bulbs on the job. Furthermore, the plastic globe protects the workmen from the glass fluorescent tube, and so there is no need for the cage that has to be used with the incandescent lamps. The inventor has also observed that even if the string of lamps falls when it has been turned on, the lamps do not break or go out, and can just be re-strung in the workplace. Also, in a preferred arrangement there are eyes or loops on the sockets to permit them to be tied with tie wire to the ceiling joists or rafters, etc., of the area under construction. The compact fluorescent lamps can be used in temperature down to about minus 20 degrees F., and even in winter conditions these lamps will warm up to full power in about five to fifteen minutes.

While the preferred embodiment uses screw-in lamps, it is also possible to use other arrangements, if desired, such as compact fluorescent lamps and sockets with a bayonet or other configuration.

The above and many other objects, features, and advantages of this invention will be more fully appreciated from the ensuing description of a preferred embodiment, which is to be read in conjunction with the accompanying Drawing.

DETAILED DESCRIPTION OF THE PREFERRED EMBODIMENT

Figure 1:
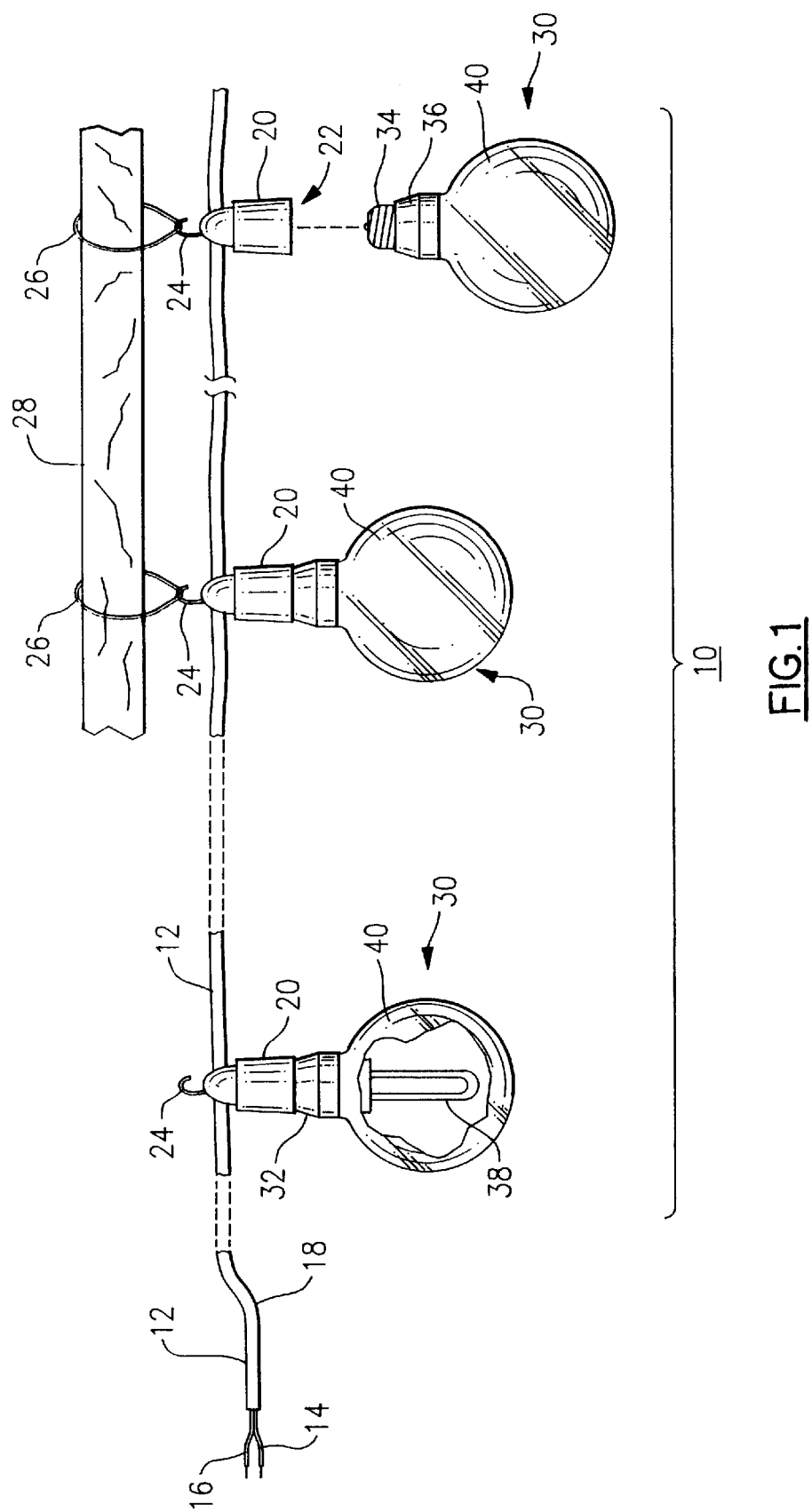
FIG. 1 shows a worklight string according to one preferred embodiment of this invention.

With reference now to the Drawing Figure, a worklight string 10 here is shown to incorporate a power cable or power cord 12. Here, the cord 12 is a two-conductor cable, i.e., one "hot" conductor 14 and one "neutral" conductor 16, and a plastic or other insulating sheath 18. There are a number of sockets 20 situated along the cord 12, each socket being physically mounted or affixed to the cord and also electrically connected with the conductors 14 and 16, in known fashion. Here, each socket has a female threaded receptacle 22. Each socket also has a open or closed loop or eye 24, that permits the sockets to be attached to the building structure, such as by tying a wire loop 26 through the eye 24 and also around a building rafter or beam 28.

For each socket there is a compact fluorescent lamp unit 30. While there are only three lamps 30 and sockets 20 illustrated here, it should be understood that in a practical light string there would be at least ten, and could be thirty or more lamps 30 on the string 10, because of the relatively low current requirement for each lamp.

In this embodiment, the lamps 30 are of a spherical design. The lamps each have a base 32 on which there is a conductive threaded shell 34 that fits into the socket receptacle 22, and a housing portion 36 that contains an electronics module for powering the lamp. A bent fluorescent tube 38 is mounted on the base 32 opposite the threaded shell 34, and a transparent or "frosted" plastic globe 40 envelopes the tube 38. The globe 40 has a neck portion 42 that fits onto the housing portion 36 of the base 32. This globe 40 can be of a tough, resilient polymer, such as carbonate (or polycarbonate). The globe will protect the fluorescent tube, and will typically absorb the shock of being dropped, or of being struck i.e., by a workman's tool, by lumber, or by a ladder. The globe will continue to protect the fluorescent tube, even if the globe becomes cracked. Also, the globe will not fall off the base, as has been the case with the protective cages mentioned before.

While a spherical globe 40 is used with these lamps 30, the globes could be of other shapes, such as ovoid, polygonal, or the like.

The compact fluorescent lamps 30 have a life of ten time or more than that of an equivalent incandescent, and normally it is unnecessary to replace any of the lamps 30 over the course of a construction job at the job site. This, of course, means that the workmen are not diverted from their normal construction tasks in order to replace bulbs, and do not need to find and move ladders or scaffolding for that purpose. Also, the globes 40 do not shatter when impacted, and so do not scatter broken glass, as happens with conventional incandescent lamps, nor do they expose the worker to live electrical parts, as can happen with a broken incandescent lamp.

Figure 2:
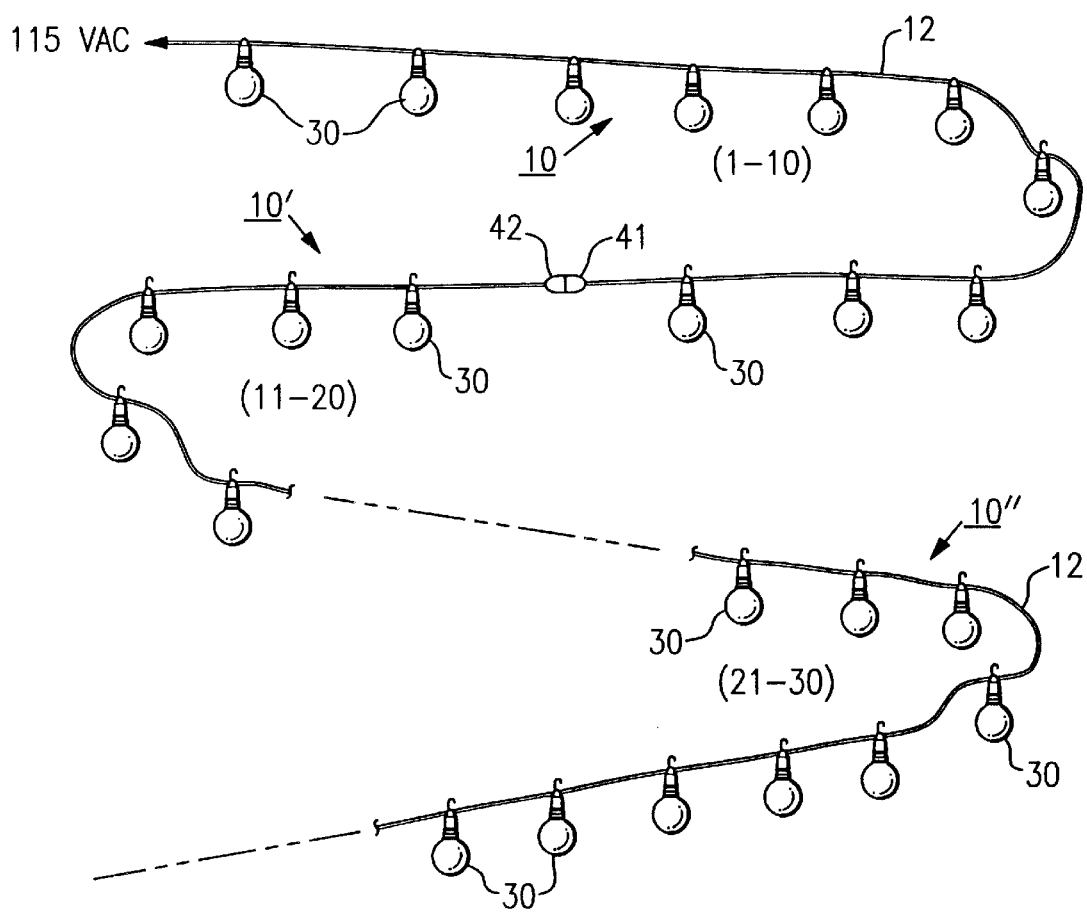
FIG. 2 is a schematic view showing three consecutive strings of ten lamps.
Figure 3:
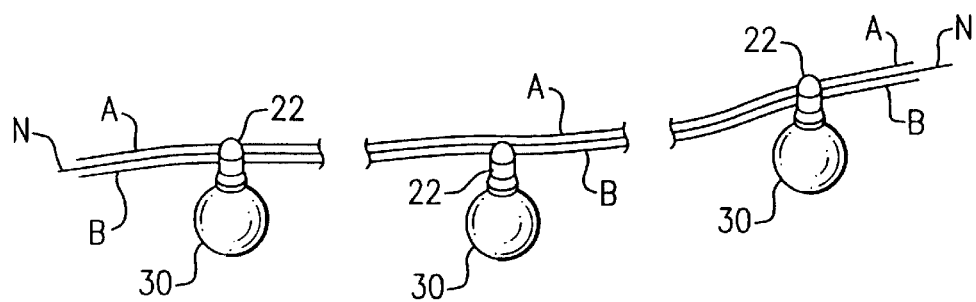
FIG. 3 is a schematic illustration of an alternative embodiment.

As shown in FIG. 2, there can be a number of strings 10, 10', 10" of lamps, each string having ten lamps 30. Mating connectors 42, 43 join the first string 10 to the second string 10'. In this view there are three strings 10, 10', 10", carrying a total of thirty lamps. Returning to FIG. 1, the power cord 12 is shown ending in a pigtail, by means of which the power cord can connect to an outlet box or to a generator. However, it is possible to terminate the cord with a power plug, if desired. Also, while the power cord 12 is here shown as a two conductor cord, the invention is not limited to that. For example, as shown in FIG. 3, the cord can be of a three-conductor configuration, i.e., first and second "phase" conductors A, B and a neutral conductor N, which would permit the string to carry even more lamps. Some of the lamps 30 have receptacles 22 connected to the N and A conductors, and some with their receptacle 22 connected between the N and B conductors.

While the invention has been described with reference to a specific preferred embodiment, the invention is certainly not limited to that precise embodiment. Rather, many modifications and variations will become apparent to persons of skill in the art without departure from the scope and spirit of this invention, as defined in the appended claims.

We claim:

1. Worklight string for use in an area under construction, comprising an elongated flexible power cord having first and second conductors and an insulating cover over said conductors;

a multiplicity of at least ten lamp sockets affixed to said power cord at intervals therealong, and each having a receptacle adapted to receive a lamp base and means connecting said receptacle to said first and second conductors;

a similar multiplicity of compact fluorescent lamps, each having at least an equivalent illumination to a 100 watt incandescent bulb, disposed respectively in said lamp sockets, and each including a base having a conductive shell for fitting into and electrically contacting an associated lamp socket receptacle, the base also having a housing portion containing an electronics module; a folded fluorescent tube mounted on said housing portion; and a resilient plastic globe member enveloping said tube and fitted onto the housing portion of the associated base.

2. The worklight string of claim 1 wherein the socket receptacles are threaded to receive a medium lamp base.

3. The worklight string of claim 1 wherein said multiplicity includes at least ten of said sockets on said power cord.

4. The worklight string of claim 1 wherein there are thirty of said sockets.

5. The worklight string of claim 1 the compact fluorescent lamps have generally spherical globes.

6. The worklight string of claim 1 wherein each said globe is a carbonate shell.

7. The worklight string of claim 1 wherein at least some of said lamp sockets include an eye member adapted to receive a wire loop for hanging the lamp socket from a building member.

8. The worklight string of claim 1 wherein said power cord is continuous for the length of said string.

9. Worklight string for use in an area under construction, comprising an elongated flexible power cord having a neutral conductor and first and second phase ac conductors and an insulating cover over said conductors;

a multiplicity of lamp sockets affixed to said power cord at intervals therealong, and each having a receptacle adapted to receive a lamp base and means connecting said receptacle to said neutral conductor and to one of the first and second conductors, such that some of the lamp sockets are connected between the first and neutral conductors and some of lamp sockets are connected between the second and neutral conductors;

a similar multiplicity of compact fluorescent lamps disposed respectively in said lamp sockets, and each including a base having a conductive shell for fitting into and electrically contacting an associated lamp socket receptacle, the base also having a housing portion containing an electronics module; a folded fluorescent tube mounted on said housing portion; and a resilient plastic globe member enveloping said tube and fitted onto the housing portion of the associated base.

\* \* \* \* \*